(12) United States Patent
Voit

(10) Patent No.: US 6,510,473 B1
(45) Date of Patent: Jan. 21, 2003

(54) APPARATUS AND METHOD FOR AUTOMATICALLY SELECTING AN APPROPRIATE SIGNAL FROM A PLURALITY OF SIGNALS, BASED ON THE CONFIGURATION OF A PERIPHERAL INSTALLED WITHIN A COMPUTING DEVICE

(75) Inventor: Paul J. Voit, Coon Rapids, MN (US)

(73) Assignee: Micron Technology, Inc., Nampa, ID (US)

( * ) Notice: Subject to any disclaimer, the term of this patent is extended or adjusted under 35 U.S.C. 154(b) by 0 days.

(21) Appl. No.: 09/378,560

(22) Filed: Aug. 19, 1999

(51) Int. Cl.[7] .............................. G06F 13/10; G06F 1/04
(52) U.S. Cl. .......................... 710/58; 710/60; 713/500; 713/501
(58) Field of Search ..................... 710/58, 60; 713/500, 713/501

(56) References Cited

U.S. PATENT DOCUMENTS

| 5,024,221 A | * | 6/1991 | Morgan | 128/419 PG |
|---|---|---|---|---|
| 5,570,397 A | * | 10/1996 | Kubista | 375/356 |
| 5,664,165 A | * | 9/1997 | Curry et al. | 395/556 |
| 5,995,578 A | * | 11/1999 | Pau | 377/47 |
| 6,084,483 A | * | 7/2000 | Keshtbod | 331/57 |

FOREIGN PATENT DOCUMENTS

| JP | 361039747 A | * | 2/1986 | H04L/13/00 |
|---|---|---|---|---|
| JP | 409237133 A | * | 9/1997 | G06F/1/08 |

OTHER PUBLICATIONS

Micron Electronic, Inc. "PRESTON" Clock Architecture for Computer with PCI Bus (no date).

* cited by examiner

Primary Examiner—Jeffrey Gaffin
Assistant Examiner—Rehana Perveen
(74) Attorney, Agent, or Firm—Knobbe Martens Olson & Bear LLP

(57) ABSTRACT

An improved computer clock circuit capable of automatically detecting the internal clock frequency of a peripheral component installed in a peripheral component interconnect (PCI) slot, and supplying the PCI slot with the a clock signal of a specified frequency. In one embodiment, the clock circuit comprises a reference clock generator having multiple clock frequencies, a phaselocked loop (PLL) based clock driver, and circuitry providing the clock driver with a selection signal indicative of the configuration of a component connected within a PCI slot. The PLL clock driver maintains phase coherency between the input and output signals, thereby reducing setup and hold times within the system and peripheral components. Additionally, the PLL clock driver reduces propagation delays within the clock circuitry, and greatly simplifies implementation of the clock circuit within a given design. In another embodiment of the invention, the clock driver is also used to generate clock signals having a predetermined relationship to those produced by the reference generator, in addition to the clock signal supplied to the PCI slot. A method of automatically selecting and providing a desired clock frequency to a PCI slot is also disclosed.

31 Claims, 5 Drawing Sheets

APPARATUS AND METHOD FOR AUTOMATICALLY SELECTING AN APPROPRIATE SIGNAL FROM A PLURALITY OF SIGNALS, BASED ON THE CONFIGURATION OF A PERIPHERAL INSTALLED WITHIN A COMPUTING DEVICE

BACKGROUND OF THE INVENTION

1. Field of the Invention

The invention relates to the field of computer architecture, specifically the selection of signals within the computer for use by peripheral component interconnect (PCI) devices and associated controllers.

2. Description of Related Technology

Peripheral component interconnect (PCI) technology is well known within the computer industry. Generally, PCI refers to a local or processor-independent bus standard. The PCI architecture generally utilizes a bridge to couple the main processor to a PCI bus used to interface with a variety of possible peripheral components. As used herein, the term "peripheral component" refers not only to a discrete computer peripheral component (such as a mass storage, input/output, or network interface device), but also to any related or ancillary components, such as circuit boards, associated therewith. The PCI architecture utilizes an external bus of finite width (such as 32 or 64 bits) operating at a given frequency (such as 33 or 66 MHz) which is used to carry both address information and write/read data to and from so-called PCI slots typically located on the computer motherboard. Hence, address information and data is multiplexed onto the PCI bus as determined by a clock circuit. The PCI architecture also includes a "burst" mode, which allows the transfer of discrete amounts of data with only one address transfer operation. The PCI bridge has the unique characteristic of being able to independently form burst access operations. Specifically, the PCI bridge can independently recognize the addressing scheme of individual transfers, and form those in a given sequence into a burst transmission. This approach is meant to accelerate bus operations, thereby increasing the PCI bus bandwidth.

Inherent in the operation of the PCI architecture is the proper selection of the clock signal frequency applied to a given PCI slot by the computer's internal clock circuit. In most applications, this clock signal must match that internal clock frequency of the peripheral component received within the slot. Prior art computer systems can generally be grouped into one of three types: (i) those having PCI slots and clock circuits using only one clock frequency; (ii) those having PCI slots and clock circuits using multiple frequencies which can not be selected automatically; or (iii) those utilizing multiple available clock frequencies which are automatically selected by a programmable logic device such as a programmable array logic (PAL) or grouped array logic (GAL) device. The limitations of the first group of systems are readily apparent, since only those components having a single given clock frequency can be accommodated. The more advanced systems of the second group have the ability to accommodate peripheral components of varying internal clock frequency; however, such systems require operator action or programming to configure the PCI slot to be supplied with a signal having a frequency matching that of the peripheral component's internal clock. The third group of systems represent an improvement over the first and second groups in that they are capable of automatically recognizing the internal clock frequency of a peripheral component when it is plugged into a given PCI slot, and providing a clock signal of the desired frequency to that slot. FIG. 1 illustrates one such prior art clock circuit capable of automatic frequency selection.

The circuit of FIG. 1 utilizes two clock generators 10, 20 to generate the clock signals input to the GAL/PAL clock driver 40. The output of the driver 40 is input to a PCI controller 60 as well as the PCI slots 50. A signal from the PCI slots 50 (M66EN in FIG. 1) is input to the clock driver 40 to select the appropriate frequency output from the driver 40. A third clock generator 30 is used to generate one or more frequencies needed within other portions of the design but not generated by the other clock generators 10, 20.

However, prior art systems such as that shown in FIG. 1 suffer from certain disabilities relating to the use of programmable logic to generate and select the appropriate signal frequency. Specifically, the array logic necessarily includes finite propagation delays which can result in variable output signal timing relationships. If a propagation delay is introduced into the transmission path of a given clock signal, that signal will be out of phase (or at least have an unknown phase relationship) with respect to other clock signals of the same frequency. Such propagation delays may ultimately result in control and/or data transfer violations within the system.

Furthermore, the aforementioned prior art array logic does not maintain a constant phase relationship between the input and output of the clock driver. If the computer's PCI architecture is completely synchronous, all the relevant components (such as Northbridge controller(s), PCI slots, NIC, Video) on the PCI bus generally must perform transactions on the rising-edge of the clock events. If there is a phase difference between the clocks providing input to the clock driver and the output signal of the clock driver, such a difference will have an effect either on the setup or hold times associated with the aforementioned components, depending on a positive or negative phase difference between clock signals provided to the different devices.

Additionally, the cost and effort associated with implementing a GAL/PAL-based device in computer applications is significant, thereby increasing the cost of the personal computer or other device in which the circuit is ultimately incorporated. Personal computers and other personal electronic devices are characteristically "low margin" products; hence, even small reductions in the cost of manufacturing can be significant in terms of the profitability and competitiveness of a given product.

Based on the foregoing, an improved clock circuit and method of generating a clock signal are needed which allow the automatic selection and provision of a clock signal appropriate for the peripheral component inserted within a given PCI slot. Specifically, such an improved circuit and method would automatically determine the internal operating frequency of the peripheral component when the component was plugged into the PCI slot, select the clock signal having the same frequency as, or having a predetermined relationship to, that of the peripheral component from a plurality of possible frequencies, and provide a clock signal with a matching frequency, or bearing some desired relationship to the clock signal of the peripheral component, back to the peripheral component and any other component related thereto. The construction of such a circuit would ideally be both simple and cost effective to implement, thereby allowing for increased host computer reliability and reduced manufacturing cost for the circuit and computer as a whole. Furthermore, such an improved circuit would also make negligible (or constant) the signal propagation delay through the clock driver, and maintain a constant phase relationship between the clock signals that are input to and output from the driver. Lastly, the design of such a circuit would ideally be such so as to permit scaling of the output so that varying clock frequencies could be readily accommodated using a given reference clock generator.

SUMMARY OF THE INVENTION

The present invention satisfies the aforementioned needs by providing an improved apparatus and method for automatically selecting the appropriate signal from a plurality of possible signals based on the configuration of a peripheral component installed within a computing device.

In a first aspect of the invention, an improved clock circuit is disclosed which is capable of simply, automatically, and reliably selecting the appropriate clock frequency of a signal which is supplied to a peripheral component. In one embodiment, a plurality of clock signals are generated by a reference clock generator and input to a phase locked loop (PLL), which is used as a clock driver. From these clock signals, the PLL selects the clock signal having the same frequency as that of the internal clock of the peripheral component, and outputs this signal to the peripheral component. Selection of the clock signal is based on a M66EN signal generated by the PCI slot, and associated PCI bus, which receives the peripheral component, when the component is plugged into the slot.

In a second aspect of the invention, an improved scalable clock circuit is disclosed. In addition to the use of the PLL as described above, a feedback circuit is used in conjunction with the PLL to generate frequencies in addition to those generated by the reference generator and supplied to the PCI slot. In one embodiment, a multiplier circuit is used in the feedback loop of the PLL in order to generate frequencies which are integer multiples of the frequencies generated by the reference signal generator. With this arrangement, the clock circuit can generate both those frequencies required by the PCI slot (such as 33 and 66 MHz), as well as integer multiples of these frequencies which may be needed by other components of the system, without having to employ a second reference generator.

In a third aspect of the invention, a computing device and circuit board incorporating the aforementioned clock circuit is disclosed. In one embodiment, the computing device is a personal computer having a motherboard with one or more PCI slots capable of receiving peripheral components with differing internal operating clock frequencies. The clock circuit of the present invention permits the automatic selection of the appropriate clock signal for the component plugged into the slot, thereby facilitating the change-out of peripheral components within the computer by the operator with minimum effort. The clock signal selected and output by the clock driver is also input to a Northbridge controller which, inter alia, controls the operation of the PCI slot(s) and bus.

In a fourth aspect of the invention, an improved method for automatically selecting and configuring the parameter(s) of a signal, and providing the signal to a peripheral component, is disclosed. A plurality of signals having different values for the parameter(s) of interest are first generated. Another signal relating to the configuration of the peripheral component is also generated; this latter signal is used to control the selection of the appropriate signal from the aforementioned plurality for use with the peripheral component. In one embodiment, two clock signals having different frequencies are generated by a clock generator within a personal computer. These clock signals are input to a phase locked loop clock driver, which matches its output signal frequency to that of the internal clock of the peripheral component based on the aforementioned configuration. The "matched" output clock signal is provided to the peripheral component and other components, such as the aforementioned PCI controller, if desired.

These and other features of the invention will become more fully apparent from the following description and appended claims taken in conjunction with the following drawings.

DETAILED DESCRIPTION OF THE INVENTION

Reference is now made to the drawings wherein like numerals refer to like parts throughout.

Figure 2:
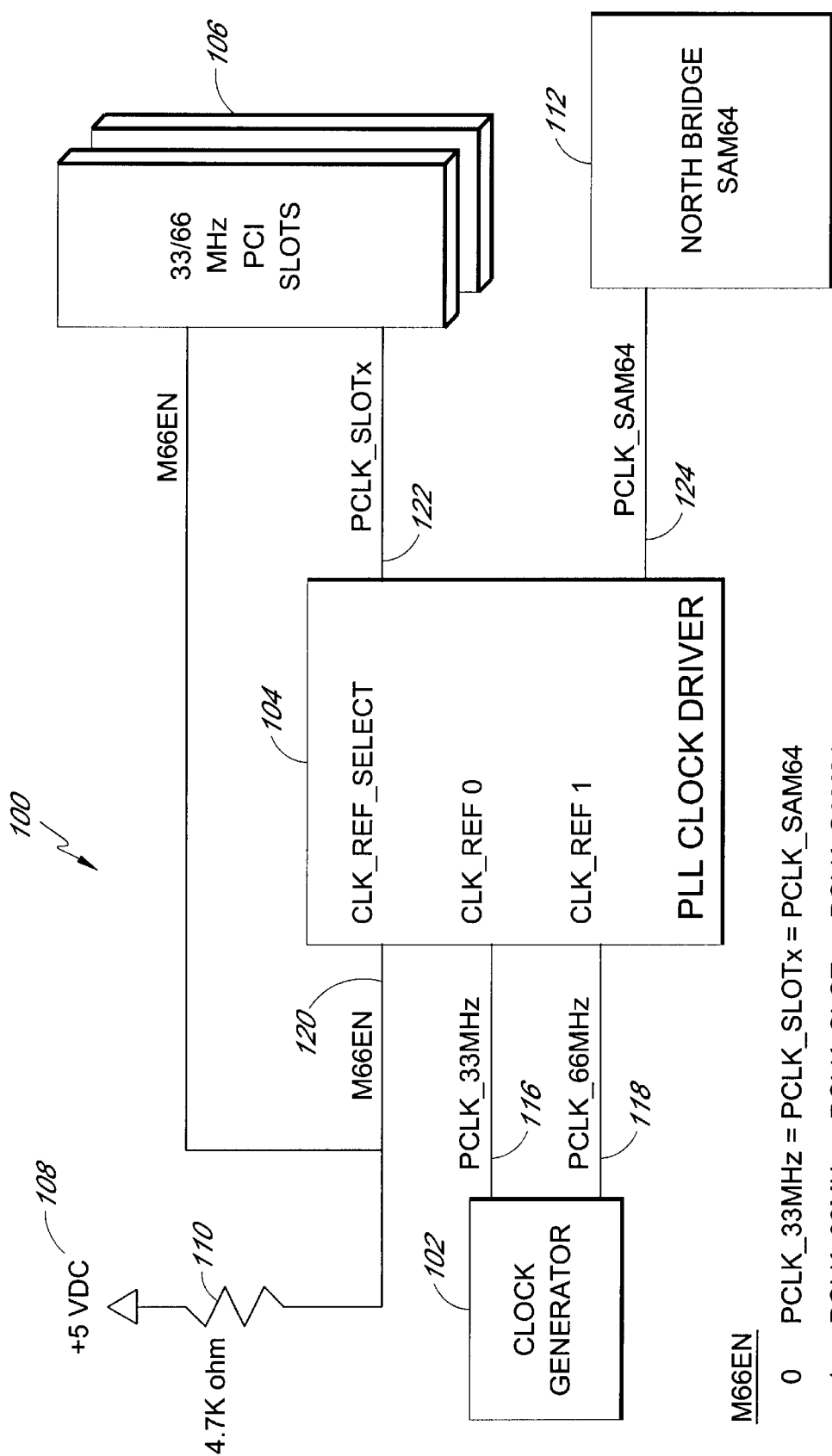
FIG. 2 is a block diagram illustrating a first embodiment of the phase-locked loop-driven clock circuit of the invention.

FIG. 2 illustrates a first embodiment of the clock circuit of the invention. This circuit 100 generally comprises a reference clock generator 102, a clock driver 104, at least one peripheral component interconnect (PCI) slot 106, a direct current voltage source 108, a resistor 110, and a bus controller 112. The clock generator 102 generates a plurality of clock signals (two in the illustrated case) each having different frequencies. Clock signal frequencies of 33 MHz and 66 MHz are used in the illustrated embodiment based on accepted standardization; however, it will be recognized that additional and/or other frequencies may be used in conjunction with the illustrated invention. The clock generator used in the embodiment of FIG. 2 is an ICS 9148-37 manufactured by Integrated Circuit Systems, Inc., although others types may be used. The construction and operation of such clock devices is well known in the electrical arts, and accordingly will not be described further herein.

The clock driver 104 of the embodiment of FIG. 2 is advantageously a phase locked loop (PLL). Phase locked loops, as is well known in the art, are electrical circuits which maintain a constant phase and frequency relationship between the input signal(s) and output signal(s). The PLL 104 of the illustrated embodiment is a QS5LV919 phase locked loop manufactured by Quality Semiconductor, Inc., although other types may be substituted. The PLL 104 has two inputs 116, 118 for reference clock signals and a selection control pin 120 to select which of the two inputs 116, 118 is to be the basis of the output signals 122, 124. It will be recognized by those of ordinary skill, however, that the PLL 104 may include any number of inputs as desired. The selection control pin 120 of the PLL 104 is provided with a signal (466EN) which is generated on the motherboard and present on the PCI bus (not shown) and PCI slots 106 on the motherboard. The M66EN signal is used by, inter alia, the plug-in PCI cards (not shown) installed within the slots 106 to indicate their compatibility with 33 or 66 MHz systems. For example, if the plug-in PCI card is only 33 MHz capable, it will force the M66EN signal to a low (e.g., 0 VDC) state. On the contrary, if the plug-in card is 66 MHz capable, the M66EN signal will remain at a positive value (such as+5 VDC in the illustrated embodiment).

The M66EN signal is used in the invention to control the output of the PLL 104 via the selection control pin 120. When the M66EN signal is low, the PLL will select the 33 MHz input signal 116 to be used as the reference for the output signals 122, 124. When M66EN is high, the PLL 104 selects the 66 MHz signal 118 as the reference. It will be recognized that while the M66EN signal is chosen in the embodiment of FIG. 2 to select the reference signal for the PLL outputs 122, 124, other signals present with the system may be used with equal success.

As illustrated in FIG. 2, the outputs 122, 124 of the PLL are provided back to the PCI slots 106 as well as optionally to the bus controller 112, respectively. In the illustrated embodiment, the controller 112 is a NorthBridge controller. As is well known in the art, the term "NorthBridge" refers to a bridge between major computer system buses, such as the system bus and the PCI bus. The NorthBridge controller functions to control components such as memory, cache, and PCI devices. It will be recognized that the North Bridge controller may have one or more discrete chips (i.e., chipset).

The resistor 110 is used to connect the DC voltage source 108 (in this case, a+5.0 VDC source) to the selection control pin 120 to bias the M66EN signal to the desired value. In the embodiment of FIG. 2, the resistor 110 is a 4700 ohm resistor of the type well known in the art. The dc voltage source 108 may be any source already present on the motherboard or otherwise present within the computer system, and it will be appreciated that other voltages, whether positive or negative with reference to ground, may be used. Depending on the voltage of the M66EN signal, the voltage applied to the selection control pin 120 of the PLL will either be high (+5.0 VDC) or low (0 VDC).

One significant advantage of the invention described herein relates to the need to maintain phase coherency between the signals 116, 118 input to and the signals 122, 124 output from the clock driver 104. If the computer's PCI architecture is completely synchronous, all the relevant components (such as NorthBridge controller(s), PCI slots, NIC, Video) on the PCI bus generally must perform transactions on the rising-edge of the clock events. If there is a phase difference between the clock signals 116, 118 input to the clock driver 104 and the output signals 122, 124 of the clock driver 104, such a difference will have an effect either on the setup or on the hold times associated with the aforementioned components, depending on whether a positive or negative phase difference between clock signals provided to each of the different devices. This effect is especially significant for the 66 MHz PCI and the new PCI-X technology, the latter having speeds of 100 and 133 MHz. The phase locked loop 104 of the invention allows for phase coherency to be maintained at all times by virtue of its design, thereby reducing setup and/or hold times within the system.

The clock circuit 100 of FIG. 2 also permits the automatic selection of the appropriate clock signal frequency for the peripheral component plugged into the PCI slot 106, thereby facilitating the change-out of peripheral components within the computer by the operator with minimum effort.

Figure 1:
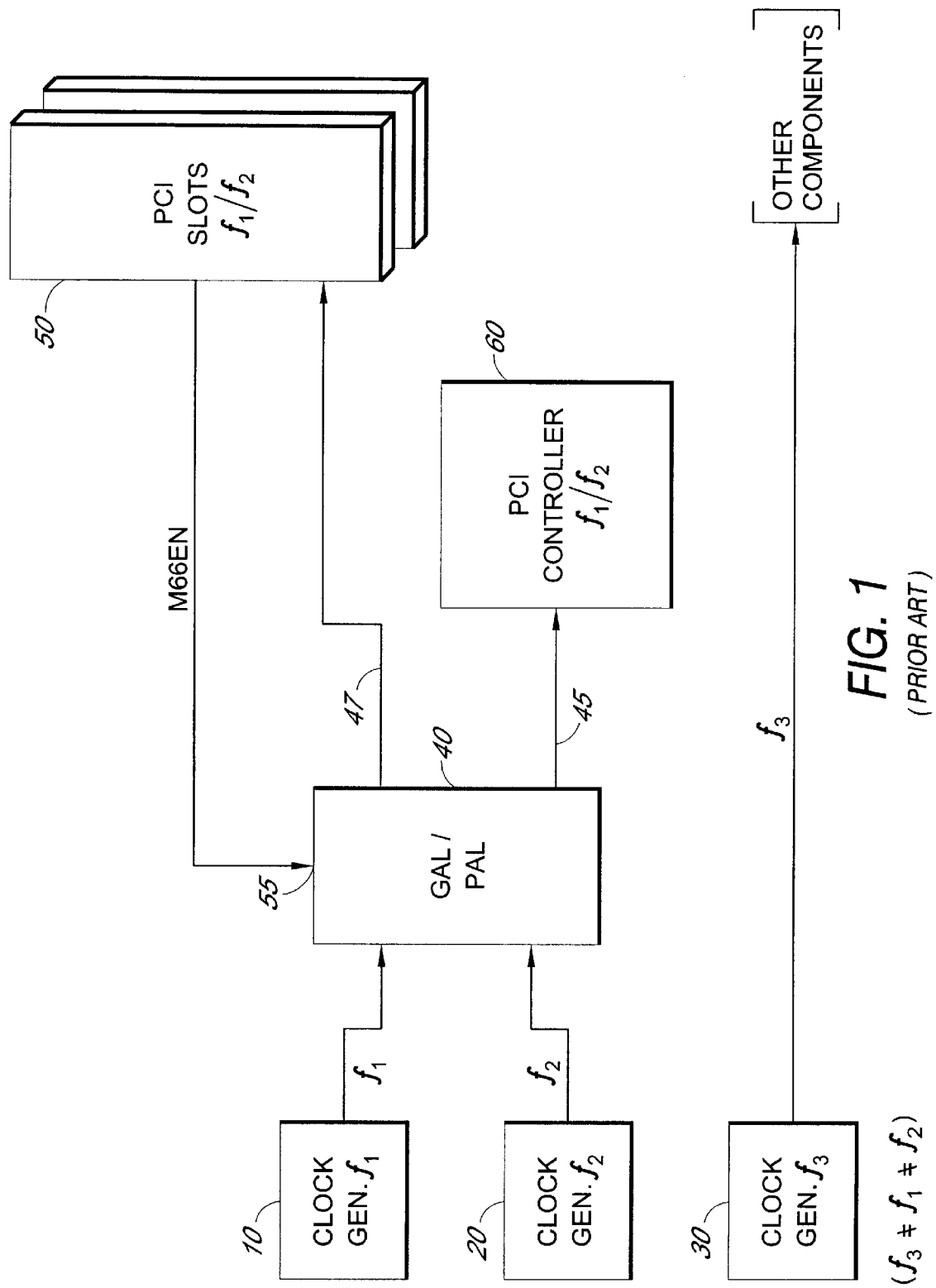
FIG. 1 is a block diagram illustrating a prior art clock circuit used within a personal computer, having a programmable logic clock driver.

A third significant advantage of the invention relates to the pin-to-pin skew on the PLL 104 versus that of a GAL/PAL device as shown in FIG. 1. Skew refers to timing differences resulting from varying circuit trace lengths and device setup and hold times. PLLs inherently have minimal skews, generally on the order of 400 ps or less. This is in contrast to GAL/PAL devices, which typically have much larger pin-to-pin skews, characteristically on the order of 1–2 ns. This reduced skew associated with the PLL 104 enhances phase coherency and increases the integrity of the design.

It is further noted that by changing the length of the feedback path (for example, using added trace delays or RC circuit elements) within the PLL 104, the output of the PLL can be delayed or advanced with respect to the input signals 116, 118. In addition to phase shifting the clock, this also allows the system designer to compensate for transmission delays across a circuit board or a backplane using the clock circuit 100. In contrast, prior art systems based on PAL/GAL cannot accomplish such phase corrections without encountering signal integrity issues. PLLs are not so limited, since the voltage controlled oscillator (VCO) used therein allows for rapid and precise phase and frequency matching between the input and the output.

Typically, all of the clock signals 116, 118 are synchronous with very little skew between them when emitted from the clock generator 102. If a propagation delay is introduced on a clock signal transmission line, the signal associated with that line will be out of synchronization (phase) compared to the other clock signals of the same frequency. This loss of synchronization may result in control/data transfer violations which can cause a system to "fail". However, in the illustrated embodiment the delay in the feedback path of the PLL 104 matches the trace delay in the PLL output path (i.e., the delay between the PLL output and the output signal destination, such as the Northbridge controller 112). Accordingly, the propagation delay from the reference clock 102 to the output signal destination is advantageously zero.

Figure 3:
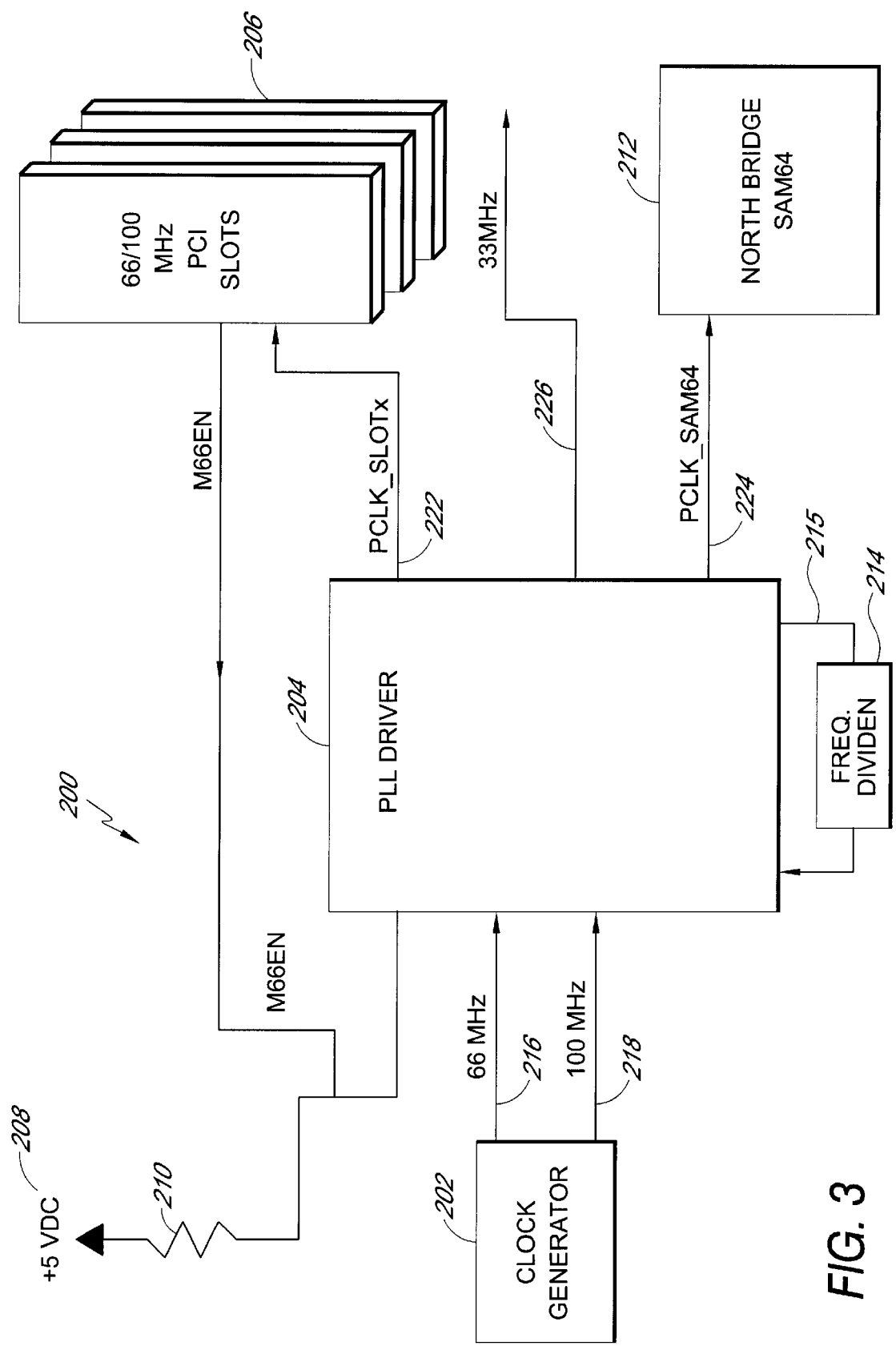
FIG. 3 is a block diagram illustrating a second embodiment of the phase-locked loop-driven clock circuit of the invention.

Furthermore, it is noted that the PLL-based clock driver 104 of the invention can also be used as a clock generator with selectable frequencies, as shown in FIG. 3. By placing an external divider or multiplier circuit 214 in the feedback path 215 of the PLL 104, other multiples of the reference clock signal frequency can be generated. In the embodiment of FIG. 3, for example, the 66 MHz input is divided (by 2) via the frequency divider circuit 214 to produce a third output signal 226. This feature allows a greater degree of design flexibility, and is especially attractive if the clock driver 204 does not produce a desired frequency that is needed elsewhere in the design. Several commercially available PLL's have dedicated outputs that both duplicate the input frequency and generate some multiple thereof, such as doubling or halving. By not requiring a separate clock generator or driver, both the cost and complexity of the computer/motherboard in which the circuit 100 is used may be reduced.

Figure 4:
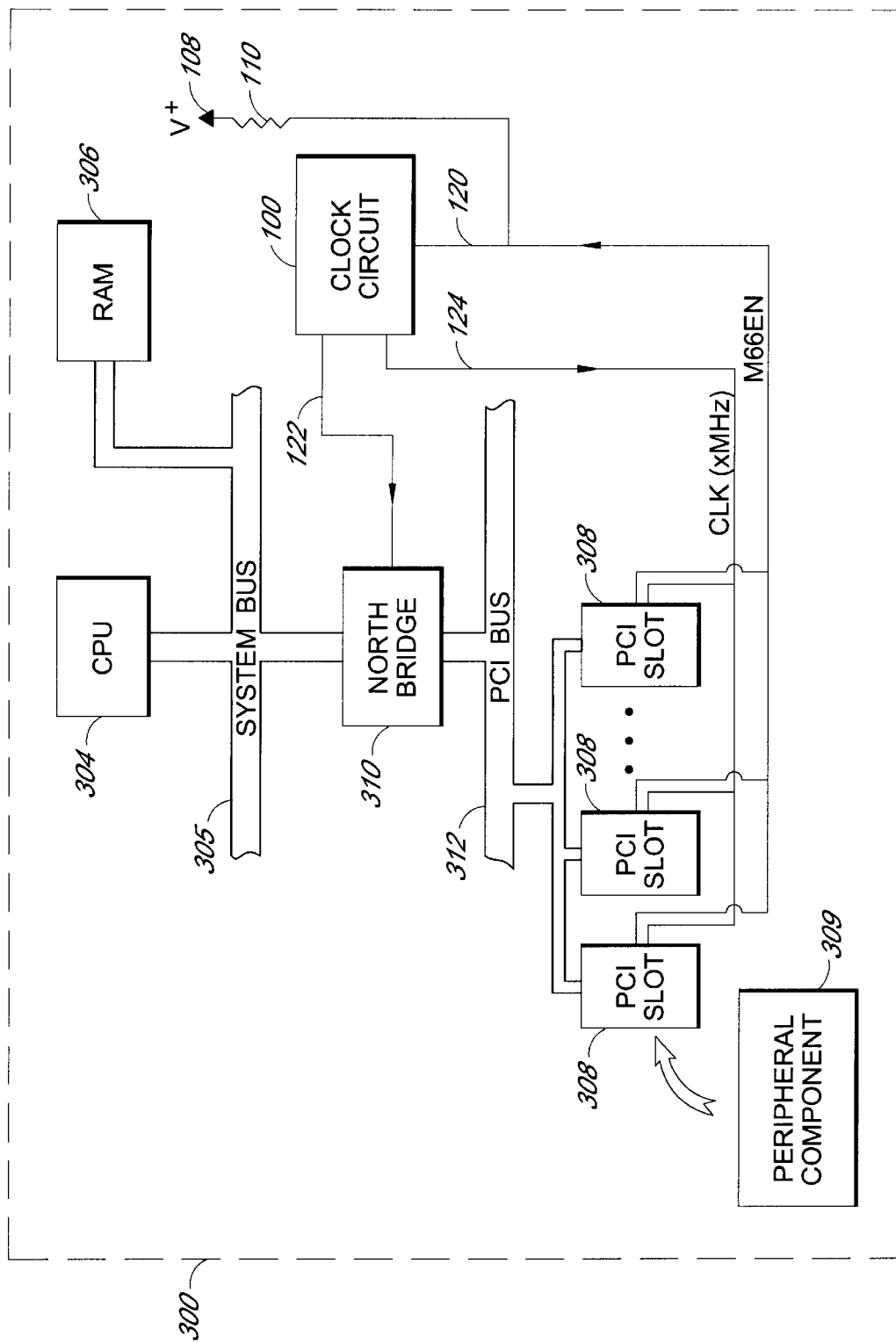
FIG. 4 is a functional block diagram of a computer motherboard incorporating the clock circuit of the invention.

Referring now to FIG. 4, a computer motherboard incorporating the clock circuit 100 of FIG. 2 is disclosed. The motherboard 300 includes a circuit board (not shown), central processing unit 304, system bus 305, random access memory 306, PCI slots 308, peripheral component 309, Northbridge controller 310, PCI bus 312, and clock circuit 100. It will be recognized to those of ordinary skill in the art that the motherboard 300 of FIG. 4 is but one illustrative configuration adapted for use in a personal computer (such as that of FIG. 5), and other configurations and combinations of components may be used. For example, the motherboard may have greater or fewer PCI slots, and may also include components such as a "Southbridge" chipset, DMA (direct memory access) controller, cache memory, and the like. It is further recognized that the clock signals 122, 124 from the clock circuit 100 may be supplied to other components on the motherboard, or even other components within the computer, if desired.

Figure 5:
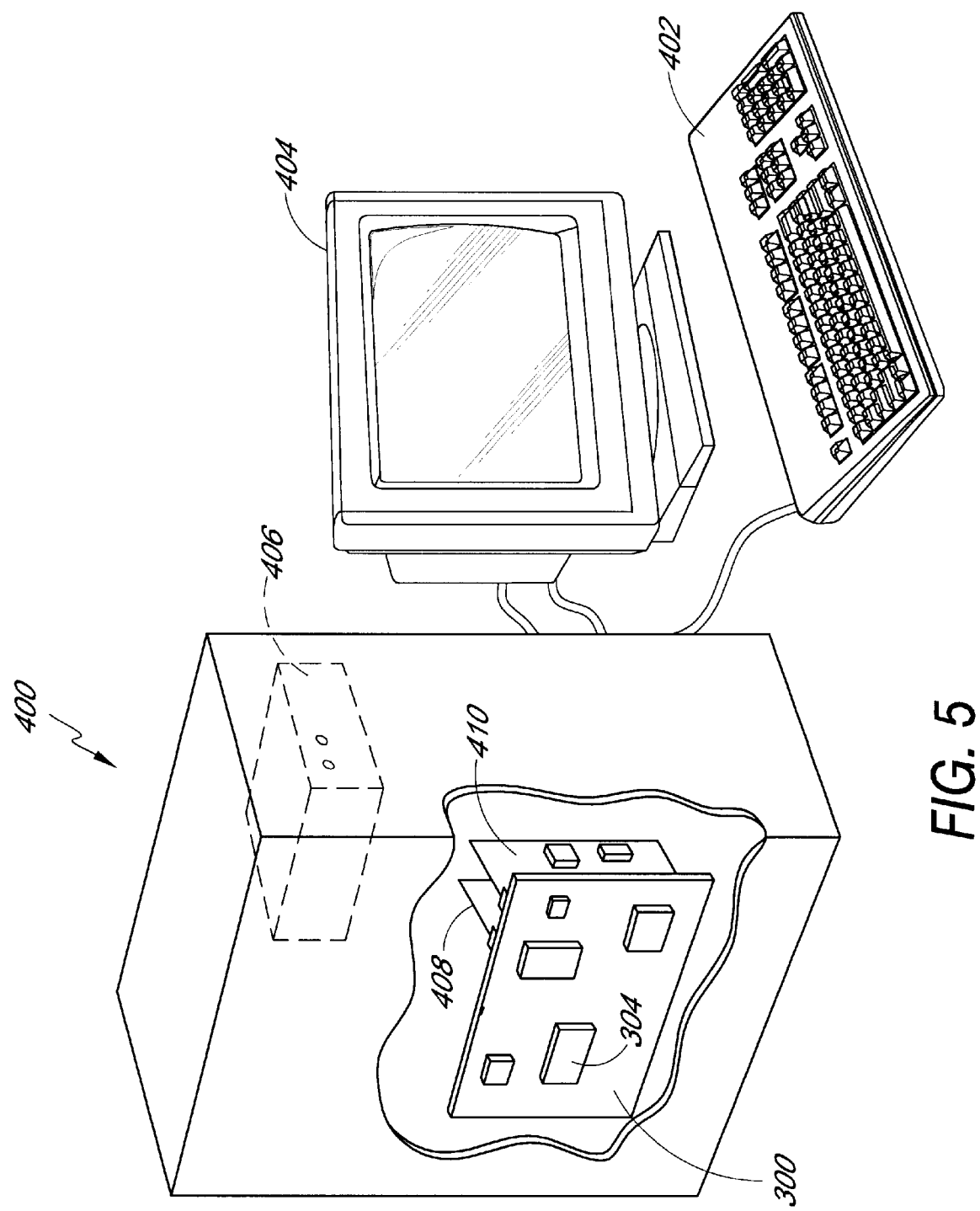
FIG. 5 is a perspective cutaway view of a first embodiment of computer incorporating the clock circuit and motherboard of FIG. 4.

Referring now to FIG. 5, a computer incorporating the motherboard of FIG. 4 is disclosed. The computer 400 includes the motherboard 300, at least one input device 402 (such as a keyboard, mouse, or light pen), a display 404 (such as a CRT or TFT display), a storage device 406 (such as a hard drive, floppy disk drive, or CD-ROM), and one or more peripheral devices (such as a LAN card 408 or graphics adapter 410), each of which are electrically connected to the central processing unit 304. While FIG. 5 depicts a personal microcomputer in the "tower" configuration, it will be recognized that many types of computing devices such as laptop computers or minicomputers may also include the clock circuit of FIGS. 2 or 3, or any modifications thereof.

While the above detailed description has shown, described, and pointed out the fundamental novel features of the invention as applied to various embodiments, it will be understood that various omissions, substitutions, and changes in the form and details of the devices or processes illustrated may be made by those skilled in the art without departing from the spirit or essential characteristics of the invention. The described embodiments are to be considered in all respects only illustrative and not restrictive. The scope of the invention is, therefore, indicated by the appended claims rather than the foregoing description. All changes that come within the meaning and range of equivalence of the claims are to be embraced within their scope.

What is claimed is:

1. A clock circuit for use in a computing device, comprising:
    a clock generator which produces at least two clock signals;
    a signal generator, said signal generator producing a selection signal indicative of the frequency of a clock signal present in a peripheral component; and
    a clock driver, operatively connected to said clock generator, which receives said at least two clock signals and generates at least one clock output signal, said clock driver configured to maintain a predetermined phase relationship between at least one of said at least two clock signals and said at least one output signal, said at least one output signal being provided to said peripheral component, and wherein the frequency of said at least one clock output signal from said clock driver is determined at least in part by said selection signal.

2. The clock circuit of claim 1, wherein said clock driver maintains phase coherency between at least one of said at least two clock signals and said at least one clock output signal.

3. The clock circuit of claim 2, wherein said clock driver is a phase locked loop (PLL) device.

4. The clock circuit of claim 3, further comprising a motherboard having at least one peripheral component interconnect (PCI) slot, said peripheral component being received within said at least one PCI slot.

5. The clock circuit of claim 4, wherein said signal generator comprises a PCI bus.

6. The clock circuit of claim 5, further comprising a PCI slot controller, and wherein said at least one output signal is also provided to said controller.

7. A clock circuit, comprising:
    a clock generator which produces at least two clock signals;
    a clock driver, operatively connected to said clock generator, which receives said at least two clock signals and generates at least one clock output signal, said clock driver configured to maintain a predetermined phase relationship between at least one of said at least two clock signals and said at least one clock output signal; and
    a signal generator, said signal generator producing a selection signal indicative of the frequency of a clock signal in an external device and wherein the frequency of said at least one clock output signal from said clock driver is determined at least in part by said selection signal.

8. The clock circuit of claim 7, further comprising at least one peripheral component interconnect (PCI) slot.

9. The clock circuit of claim 8, wherein said external device is a peripheral component having a clock, said peripheral component being received within said at least one PCI slot.

10. The clock circuit of claim 9, wherein said clock driver is a phase locked loop (PLL).

11. The clock circuit of claim 10, wherein said signal generator comprises:
    a voltage source;
    at least one electrical component operatively connected to said voltage source; and
    a PCI bus which cooperates with said voltage source and said at least one electrical component so as to generate different voltage levels corresponding to the different configurations of said peripheral component.

12. The clock circuit of claim 9, wherein said peripheral component is a circuit board which supports the operation of an input/output device.

13. The clock circuit of claim 9, wherein said at least one clock output signal from said clock driver is provided to said peripheral component.

14. A computing device having a processor, an input device, and at least one peripheral component slot and a peripheral component bus associated therewith, said at least one slot being capable of receiving at least one peripheral component having an internal clock, the improvement comprising;
    a clock generator, said generator producing a plurality of different clock signals having different frequencies;
    a clock driver, said clock driver receiving said plurality of clock signals from said clock generator, and being configured to produce at least one clock output signal derived at least in part from one or more of said plurality of clock signals, said at least one clock output signal having a substantially constant phase relationship to at least one of said plurality of clock signals; and
    a signal generator, operatively connected to said at least one peripheral component slot and said clock driver such that said signal generator produces a configuration signal related to the output of said internal clock of said at least one peripheral component, said configuration signal being input to said clock driver to determine the frequency of the clock output signal produced thereby.

15. The computer of claim 14, wherein said configuration signal is produced at least in part by said peripheral component bus.

16. The computer of claim 15, wherein said frequency of said clock output signal is an integer multiple of 33 MHz.

17. A method of selecting a value of a parameter of a signal provided to a device, comprising;
   generating a first signal having a parameter associated therewith, said parameter of said first signal having a first value;
   generating a second signal also having said parameter associated therewith, said parameter of second signal having a second value;
   generating a third signal relating to the configuration of said device;
   generating a fourth signal having said parameter associated therewith, the value of said parameter of said fourth signal being derived from said first or second values and determined at least in part by said third signal, said fourth signal further having a substantially constant phase relationship to at least one of said first and second signals; and
   providing said fourth signal to said device.

18. The method of claim 17, wherein the acts of generating said first and second signals comprise the act of generating clock signals having said parameter associated therewith.

19. The method of claim 18, wherein said parameter is a frequency of oscillation.

20. The method of claim 19, wherein the acts of generating said first and second signals comprise the act of generating said first signal having a frequency different than that of said second signal.

21. The method of claim 20, wherein the act of generating a third signal further comprises the act of determining the clock frequency of said device.

22. A method of automatically selecting the frequency of an external clock signal provided to a peripheral component having an internal clock, comprising:
   generating a first signal having a first frequency;
   generating a second signal having a second frequency;
   generating a third signal relating to the operating frequency of said internal clock of said peripheral component;
   generating said external clock signal, said external clock signal having a frequency derived from that of said first or second signals, said frequency of said external clock signal being determined at least in part by said third signal, said external clock signal further having a substantially constant phase relationship to at least one of said first and second signals; and
   providing said external clock signal to said peripheral component.

23. The method of claim 22, wherein the act of generating said external clock signal comprises the act of generating a signal having the same frequency as said operating frequency of said clock of said peripheral component.

24. A circuit board for use in a computing device, comprising:
   a processor;
   at least one peripheral component interconnect (PCI) slot, said at least one slot being adapted to receive a peripheral component having any one of a plurality of internal clock frequencies, said at least one slot being capable of generating a configuration signal indicative of the internal clock frequency of a peripheral component received therein;
   a controller, said controller being operatively connected to said at least one PCI slot and controlling at least a portion of the operation thereof;
   at least one peripheral component having an internal clock, said internal clock producing a clock signal having a first clock frequency, said peripheral component being received within said at least one PCI slot;
   a clock generator configured to generate a plurality of clock signals having frequencies which correspond to those of said plurality of internal clock frequencies of said peripheral component, at least one of said plurality of clock signals having a frequency which is the same as said first clock frequency; and
   a clock driver configured to receive said plurality of clock signals from said clock generator and to generate an output signal having a frequency the same as said first frequency, said clock driver selecting said frequency of said output signal based at least in part on said configuration signal, said output signal further being provided to said peripheral component and said controller.

25. The circuit board of claim 24, wherein said circuit board is a motherboard of a computer.

26. The circuit board of claim 25, wherein said output signal from said clock driver is maintained in a substantially constant phase relationship to said clock signal of said internal clock of said peripheral component.

27. The circuit board of claim 26, wherein said clock driver is a phase-locked loop (PLL).

28. The circuit board of claim 27, wherein said PLL has a pin-to-pin skew of less than 400 ps.

29. A clock circuit for use in a computing device, comprising;
   a reference clock generator capable of producing at least one clock signal;
   a clock driver operatively connected to said reference clock generator which receives said at least one clock signal and generates a first clock output signal;
   at least one feedback circuit connected to the clock driver, said at least one feedback circuit modifying said first clock output signal and communicating the modified output signal to the clock driver such that said clock driver produces an output signal at a frequency having a predetermined relationship to the frequency of said at least one clock signal produced by said reference generator; and
   a signal generator which produces a selection signal indicative of the frequency of a clock signal in an external device;
   wherein the frequency of said output signal from said clock driver is determined at least in part by said selection signal.

30. The clock circuit of claim 29, wherein said clock driver is a phase-locked loop.

31. The clock circuit of claim 30, wherein said predetermined relationship is defined by said second output signal having a frequency which is an integer multiple, or the reciprocal of said integer multiple, of the frequency of said at least one clock signal produced by said reference generator.

* * * * *

UNITED STATES PATENT AND TRADEMARK OFFICE
CERTIFICATE OF CORRECTION

PATENT NO. : 6,510,473 B1
DATED : January 21, 2003
INVENTOR(S) : Paul J. Voit

It is certified that error appears in the above-identified patent and that said Letters Patent is hereby corrected as shown below:

<u>Column 5,</u>
Line 1, please change "(466EN)" to -- (M66EN) --.

<u>Column 7,</u>
Line 52, please change "one output" to -- one clock output --.

Signed and Sealed this

Second Day of March, 2004

JON W. DUDAS
*Acting Director of the United States Patent and Trademark Office*